United States Patent
Kim

(10) Patent No.: US 9,807,491 B2
(45) Date of Patent: Oct. 31, 2017

(54) ELECTRONIC DEVICE WITH WIRELESS EARBUD

(71) Applicant: PINN, Inc., Tustin, CA (US)

(72) Inventor: Seung Jin Kim, Irvine, CA (US)

(73) Assignee: PINN, INC., Tustin, CA (US)

( * ) Notice: Subject to any disclaimer, the term of this patent is extended or adjusted under 35 U.S.C. 154(b) by 0 days.

(21) Appl. No.: 15/625,935

(22) Filed: Jun. 16, 2017

(65) Prior Publication Data

US 2017/0289668 A1    Oct. 5, 2017

Related U.S. Application Data

(63) Continuation of application No. PCT/US2016/025936, filed on Apr. 4, 2016.

(Continued)

(51) Int. Cl.
| | | |
|---|---|---|
| *H04R 1/10* | (2006.01) | |
| *H04R 1/04* | (2006.01) | |
| *G06F 3/16* | (2006.01) | |

(52) U.S. Cl.
CPC ........... *H04R 1/1041* (2013.01); *G06F 3/165* (2013.01); *H04R 1/04* (2013.01); *H04R 1/1016* (2013.01);

(Continued)

(58) Field of Classification Search
CPC ...... H04R 1/1041; H04R 1/04; H04R 1/1016; H04R 1/1025; H04R 2420/07; G06F 3/165

(Continued)

(56) References Cited

U.S. PATENT DOCUMENTS 6,765,789 B2   7/2004 Yang
6,768,911 B2   7/2004 Hino et al.
(Continued)

FOREIGN PATENT DOCUMENTS

WO   2005/053289 A1   6/2005
WO   2010/083829 A1   7/2010

OTHER PUBLICATIONS

Archived website, http://mypinn.com in 4 pages. The website, http://mypinn.com, was first published on May 5, 2016 and archived on Jun. 26, 2016. Archived copy was downloaded from https://web.archive.org/web/20160626155438/http://mypinn.com/ on Apr. 13, 2017.

(Continued)

*Primary Examiner* — David Ton
(74) *Attorney, Agent, or Firm* — Knobbe Martens Olson & Bear LLP

(57) ABSTRACT

The disclosure herein provides a personal wireless media station including a main body and a wireless earbud. The personal wireless media station may detect that an earbud connector of the wireless earbud is connected to a main body connector of the main body, play sound through a speaker of the main body while the earbud connector is connected to the main body connector, detect that the earbud connector has disconnected from the main body connector, cease to play sound through the speaker of the main body in response to detecting that the earbud connector has disconnected from the main body connector, and wireless send audio data to the wireless earbud and cause sound to be played through the wireless earbud while the earbud connector is not connected to the main body connector.

18 Claims, 4 Drawing Sheets

Related U.S. Application Data

(60) Provisional application No. 62/142,978, filed on Apr. 3, 2015.

(52) U.S. Cl.
CPC ....... *H04R 1/1025* (2013.01); *H04R 2420/07* (2013.01)

(58) Field of Classification Search
USPC ............ 381/311, 322, 323, 79, 74; 455/573, 455/575.1, 575.2, 556.1, 41.2
See application file for complete search history.

(56) References Cited

U.S. PATENT DOCUMENTS

| | | | |
|---|---|---|---|
| D586,823 S | 2/2009 | Anderson et al. | |
| D600,013 S | 9/2009 | McCune | |
| 7,643,283 B2 | 1/2010 | Jubelirer et al. | |
| 7,738,247 B2 | 6/2010 | Choi | |
| 7,869,195 B1 | 1/2011 | Patton | |
| 8,121,329 B2 | 2/2012 | Groset et al. | |
| 8,213,666 B2 | 7/2012 | Groesch | |
| 8,238,967 B1 | 8/2012 | Arnold et al. | |
| D667,390 S | 9/2012 | Matera | |
| 8,384,527 B2 | 2/2013 | Irwin | |
| 8,582,755 B2 | 11/2013 | Bradford et al. | |
| 8,867,748 B2 | 10/2014 | Posa | |
| 9,002,420 B2 | 4/2015 | Pattikonda et al. | |
| D728,624 S | 5/2015 | Akana et al. | |
| 9,319,766 B2 | 4/2016 | Weinstein et al. | |
| 2005/0008147 A1 | 1/2005 | Lee | |
| 2005/0107120 A1 | 5/2005 | Yueh | |
| 2005/0186905 A1 | 8/2005 | Tracy et al. | |
| 2006/0166715 A1 | 7/2006 | Engelen et al. | |
| 2007/0147629 A1 | 6/2007 | Chiloyan | |
| 2008/0108306 A1 | 5/2008 | Yee | |
| 2009/0046869 A1 | 2/2009 | Griffin, Jr. et al. | |
| 2010/0245585 A1 | 9/2010 | Fisher et al. | |
| 2010/0312944 A1 | 12/2010 | Walker | |
| 2011/0141357 A1 | 6/2011 | Price et al. | |
| 2013/0206612 A1 | 8/2013 | Chun | |
| 2014/0116085 A1 | 5/2014 | Lam | |
| 2014/0295758 A1 | 10/2014 | Pedersen | |
| 2015/0078575 A1* | 3/2015 | Selig | H04R 1/1091 381/74 |
| 2015/0241922 A1 | 8/2015 | Farjami | |
| 2015/0245126 A1* | 8/2015 | Shaffer | H04R 1/1025 381/74 |
| 2015/0326990 A1 | 11/2015 | Yeh et al. | |
| 2015/0373448 A1* | 12/2015 | Shaffer | H04R 1/1025 381/74 |
| 2016/0360350 A1 | 12/2016 | Watson et al. | |
| 2017/0013342 A1 | 1/2017 | Watson et al. | |

OTHER PUBLICATIONS

Website, http://mypinn.com/ in 5 pages. The copy was downloaded on Apr. 13, 2017.
Website, https://www.kickstarter.com/projects/906938906/pinn-all-in-one-earbud-mic-and-oled-display-for-sm?ref=discovery in 20 pages. The website was published on Aug. 10, 2016 and the copy was downloaded on Apr. 13, 2017.
Website, https://www.banggood.com/Separate-Design-Bluetooth-Handsfree-Headset-Sports-Watch-For-iPhone-6-p-951983.html in 6 pages. The copy was downloaded on Jun. 15, 2017.
International Search Report and Written Opinion dated Jul. 11, 2016 of PCT/US16/25936 which is the parent application—10 pages.
Website, https://www.banggood.com/Link Dream Separate Design Bluetooth Headset Sports Watch for iPhone 6-p-951983.html in 12 pages. The copy was downloaded on May 1, 2016.
Notification of Transmittal of International Preliminary Report on Patentability dated Jul. 17, 2017 in corresponding PCT application No. PCT/US2016/025936 in 28 pages.
Communication in cases for which no other form is applicable dated Aug. 15, 2017 in corresponding PCT application No. PCT/US2016/025936 in 12 pages.

* cited by examiner

ELECTRONIC DEVICE WITH WIRELESS EARBUD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Today, wireless communication devices are very widely used. Mobile devices including smart phones, tablet computers, or the like are often used in conjunction with other wireless devices that can be paired with the mobile devices to provide better access to the inputs and outputs (e.g., display, speaker, microphone, etc.) of the mobile devices. For example, a user may want to keep his smart phone in his pocket while he is having a phone call or listening to music. In such a case, the user can establish a pairing between his smart phone and a wireless headset, so that the wireless headset can relay information to and from his smart phone, thereby eliminating the need to have an unobstructed access to the inputs and outputs provided on the smart phone.

SUMMARY

One aspect of the invention provides an apparatus comprising: a main body comprising a connection hole, a user input button, at least one processor and at least one memory; and a wireless earbud configured for plugging into the connection hole of the main body to form a single integrated body with the main body.

In the apparatus, the wireless earbud has wireless communication capability for wirelessly pairing with a smartphone and is configured to receive audio data from the smartphone and to play audio using the audio data from the smartphone when wirelessly paired with the smartphone. In addition to wireless communication capability for wireless pairing with the smartphone, the wireless earbud comprises an earbud connector for connecting with an electric circuit of the main body for wired communication capability with the main body when plugged into the connection hole. When plugged into the connection hole, the wireless earbud is configured to get battery charging from the main body and additionally to perform two-way data communication with the main body. The at least one processor of the main body is configured to execute computer program instructions stored in the at least one memory for initiating the wireless pairing with the smartphone in response to pressing of the user input button provided on the main body, and for turning off the wireless pairing with the smartphone when the wireless earbud gets charged.

In the foregoing apparatus, the main body may further comprise a mechanical clip attached to the main body for clipping the main body to a person's clothing or accessory. The main body may further comprise a camera. The main may body further comprise a wireless communication module configured to wirelessly pair with the smartphone and perform wireless data communication with the paired smartphone. The main body further comprises a display configured to display information from the smartphone by wireless data communication. The main body may further comprise a speaker configured to play sound based on wireless data communication with the smartphone. The apparatus may be programmed: to detect when the wireless earbud is plugged into the connection hole, to play sound through the speaker of the main body while the wireless earbud is plugged into the connection hole, to detect when the wireless earbud is unplugged from the connection hole, and to stop playing sound through the speaker when it is detected that the wireless earbud is unplugged from the connection hole.

The apparatus may be further programmed to cause audio data to be sent to the wireless earbud and to play sound through the wireless earbud while the wireless earbud is unplugged from the connection hole. Wherein, when paired with the smartphone, the apparatus is configured: to provide a battery status to the smartphone for displaying on a mobile application of the smartphone; and to let the mobile application control at least one function of the apparatus.

Another aspect of the invention provides a method of operating the foregoing apparatus. The method comprises: initiating wireless pairing with the smartphone in response to pressing of the user input button provided on the main body; and turning off the wireless pairing with the smartphone when the wireless earbud gets charged from the main body.

In some aspects, a personal wireless media station is in communication with a paired mobile computing device of a user for playing sound and displaying information based on communication with the paired mobile computing device. The personal wireless media station includes a main body, a wireless earbud, a first wireless module, and a second wireless module. The main body includes an information display, a speaker, the fire and second wireless modules, and a main body connector. The wireless earbud includes an earbud connector that is mateable with the main body connector. The wireless earbud and the main body form a single integrated body when the earbud connector and the main body connector are connected with each other. The first wireless module wirelessly communicates with a mobile computing device that has been paired with the personal wireless media station. The second wireless module wirelessly communicates with the wireless earbud.

In some aspects, the personal wireless media station plays sound through the speaker or causes the wireless earbud to play sound when the personal wireless media station receives audio data from the paired mobile computing device via the first wireless module. The personal wireless media station is programmed to detect when the earbud connector connects to the main body connector, play sound through the speaker of the main body while the earbud connector is connected to the main body connector, detect when the earbud connector disconnects from the main body connector, stop playing sound through the speaker when it is detected that the earbud connector is disconnected from the main body connector, and wirelessly send audio data to the earbud and cause to play sound through the earbud while the earbud connector is not connected to the main body connector.

In some aspects, the personal wireless media station is further programmed to stop wireless sending of audio data to the earbud when it is detected that the earbud connector has got connected to the main body connector, and start wireless sending of audio data to the earbud when it is detected that the earbud connector has got disconnected from the main body connector.

In some aspects, the first wireless module performs two-way wireless data communication with the paired mobile computing device, the second wireless module performs one-way wireless data communication to send data to the wireless earbud, and the wireless earbud is not capable of wirelessly sending data to the personal wireless media station.

In some aspects, the wireless earbud is not capable of wirelessly sending data to the personal wireless media station, and the wireless earbud is capable of performing two-way wired data communication with the personal wireless media station when the earbud connector is connected to the main body connector.

In some aspects, the personal wireless media station plays sound only as it receives from the paired mobile computing device audio data for the sound to play.

In some aspects, the personal wireless media station does not include a digital storage device for storing a library of audio contents that are not being played through either the speaker or the earbud.

In some aspects, the personal wireless media station further includes a mechanical clip attached to the main body for clipping the wireless media station to a person's clothing or accessory.

In some aspects, both the earbud connector and the main body connector are audio connectors, wherein one of the audio connectors is a female audio connector and the other is a male audio connector.

In some aspects, the personal wireless media station further includes a camera module integrated with the main body.

In some aspects, the personal wireless media station further includes a microphone integrated with the main body, wherein the personal wireless media station plays sound of telephonic conversation from the paired mobile computing device. When the earbud connector is connected to the main body connector, the sound of telephonic conversation plays through the earbud while the user's voice is inputted through the microphone of the main body.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which.

DETAILED DESCRIPTION OF EMBODIMENTS

Embodiments of the invention will now be described with reference to the accompanying figures. The terminology used in the description presented herein is not intended to be interpreted in any limited or restrictive manner, simply because it is being utilized in conjunction with a detailed description of certain specific embodiments of the invention. Furthermore, embodiments of the invention may comprise several novel features, no single one of which is solely responsible for its desirable attributes or which is essential to practicing the inventions herein described.

Perspective View of Personal Wireless Media Station

Figure 1:
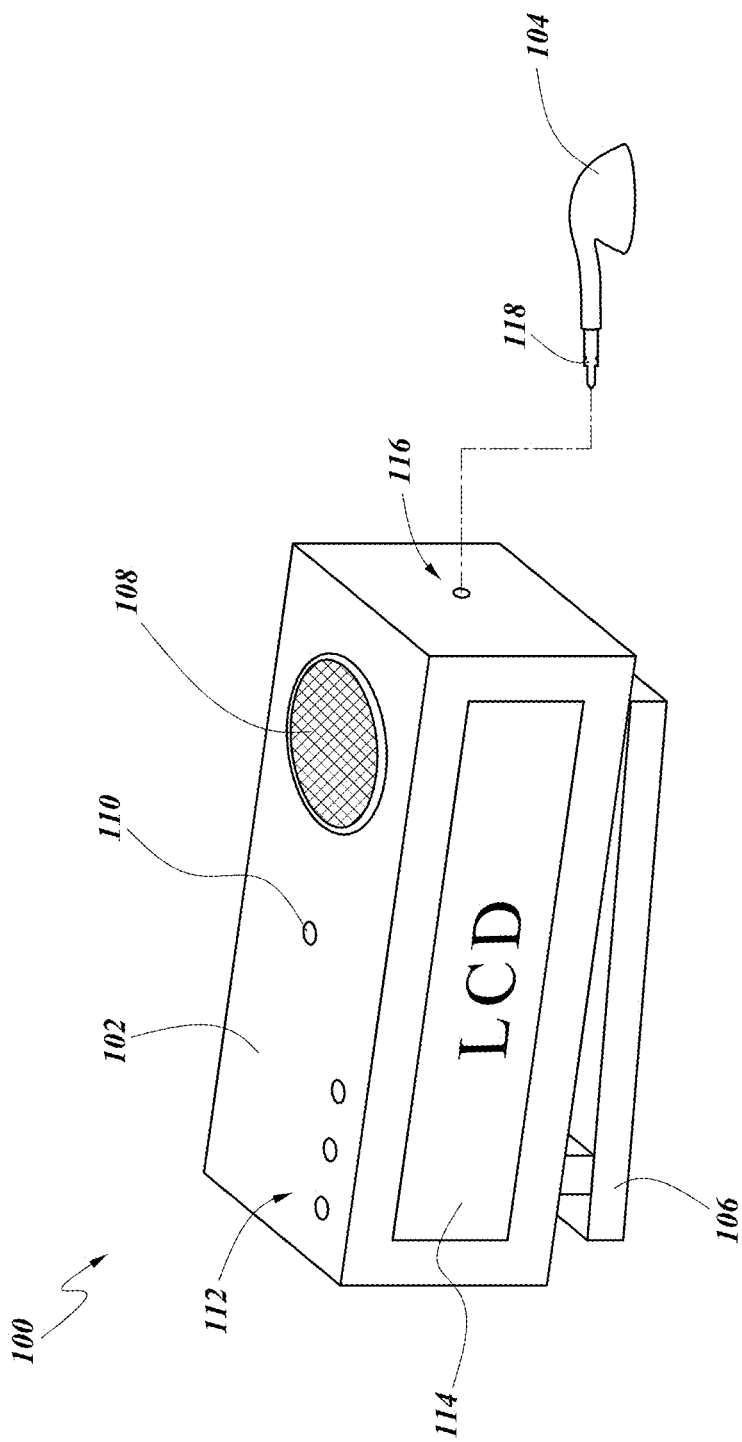
FIG. 1 illustrates a perspective view of a personal wireless media station in accordance with an embodiment.

FIG. 1 illustrates a perspective view of the personal wireless media station 100 in accordance with an example embodiment. The personal wireless media station 100 includes a main body 102 and a wireless earbud 104.

Main Body

The main body 102 includes a clip 106, a speaker 108, a light-emitting diode (LED) light indicator 110, a microphone 112, a liquid crystal display (LCD) screen 114, and a main body connector 116. The clip 106 clips the personal wireless media station 100 to the user's clothing (e.g., shirt, tie, pocket, etc.). Instead of the clip 106, the main body 102 may include any other attachment mechanism such as a band or other fasteners for attaching the main body 102 to the user's body. The speaker 108 plays back sound from another user device (not shown) paired with the personal wireless media station 100. The LED light indicator 110 indicates information to the user by blinking or flashing light therefrom. The microphone 112 captures sound information and provides the captured sound information to the user device paired with the personal wireless media station 100. The LCD screen displays information to the user. The displayed information may include, but is not limited to, call information, song information, text message information, email information, and the like.

Wireless Earbud

The wireless earbud 104 includes an earbud connector 118. As illustrated in FIG. 1, the earbud connector 118 of the wireless earbud 104 is mateable with the main body connector 116 of the main body 102. The wireless earbud 104 plays back sound information received from the main body 102 of the personal wireless media station 100. In some embodiments, the wireless earbud 104 plays back sound received from the main body 102 when the earbud connector 118 is not connected to the main body connector 116. When the earbud connector 118 is connected to the main body connector 116, the wireless earbud 104 and the main body 102 for a single integrated body.

Other Components of Main Body

Although not shown in FIG. 1, the personal wireless media station 100 may include one or more buttons or sensors for receiving the user's input. Such buttons or sensors may include a power button, volume control button(s), touch sensitive button(s), function button(s), or the like. The personal wireless media station 100 may include a charging slot (not shown) into which a charging cable (not shown) for charging the personal wireless media station 100 may be inserted. The personal wireless media station 100 may also include one or more other components (e.g., a camera) that are not illustrated in FIG. 1. Further, the personal wireless media station 100 may include one or more additional wireless earbuds 104, clips 106, speakers 108, LED indicators 110, microphones 112, LCD screens 114, and/or main body connectors 116. In some embodiments, one or more of the components shown in FIG. 1 may be omitted.

Example Use of Personal Wireless Media Station

Figure 2:
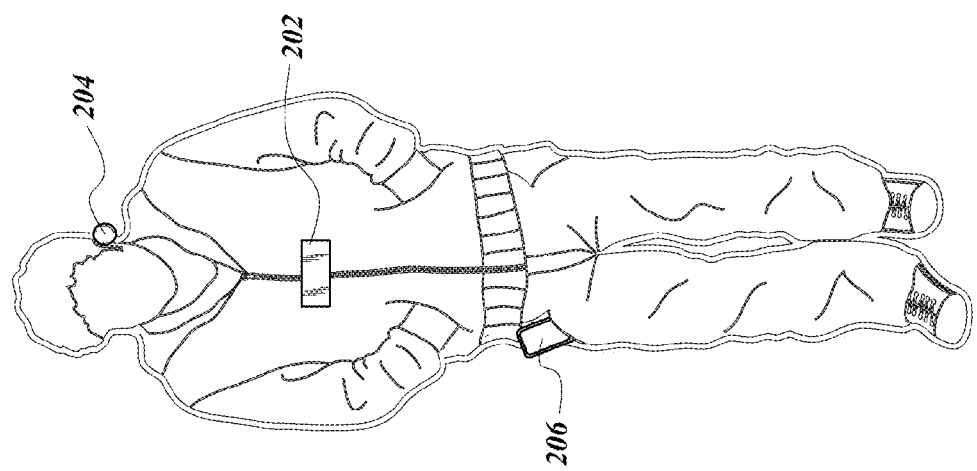
FIG. 2 illustrates an example use of a personal wireless media station in accordance with an embodiment.
Figure 2:
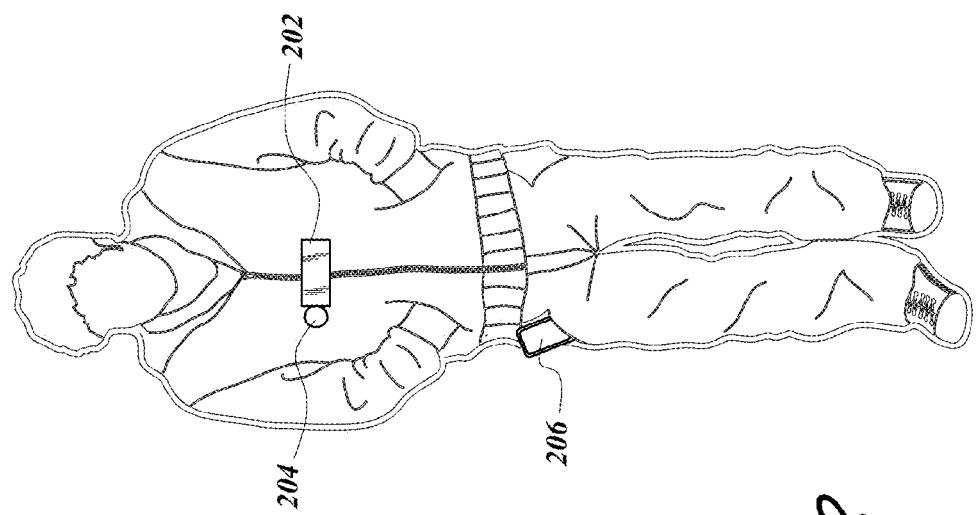

FIG. 2 illustrates an example use of a personal wireless media station 200. As illustrated in FIG. 2, the personal wireless media station 200 includes a main body 202 and a wireless earbud 204. The personal wireless media station 200 is further paired with a user device 206. In mode 1, the wireless earbud 204 is connected to the main body 202. When the wireless earbud 204 is connected to the main body 202, the sound information transmitted from the user device 206 to the personal wireless media station 200 is played back through the speaker of the main body 202. In mode 2, the wireless earbud 204 has been detached from the main body 202, and the user has the wireless earbud 204 plugged into his ear. When the wireless earbud 204 is not connected to the main body 202, the sound information transmitted from the user device 206 to the personal wireless media station 200 is played back through the wireless earbud 204. In mode 2, all other components of the main body 202 (e.g., other than the speaker) may still be active and may output and/or collect information to and from the user.

Detecting Connection and Disconnection

The main body connector 116 may, include a switch that is used for plug detection (e.g., such a switch may be switched on upon insertion of a connector). Alternatively or additionally, the main body connector 116 may include circuitry that measures the impedance and/or other characteristics of the connector (e.g., the earbud connector 118) that plugs into the main body connector 116. The main body connector 116 may provide any measured information to the processor included in the personal wireless media station 100.

Connectors

In some embodiments, the main body connector 116 is a female 3.5 mm in earphone socket, and the earbud connector 118 is a male 3.5 mm earphone plug. The main body connector 116 is configured to receive the earbud connector 118.

Playing Sound Between Main Body and Wireless Earbud

Upon insertion of the earbud connector 118 into the main body connector 116, the sound information received from the user device (not shown) stops to be played back via the speaker 108 and begins to be played back via the wireless earbud 104. The techniques for redirecting the playback of the sound information are described in greater detail below with reference to FIG. 4.

Example Flowchart for Redirecting Sound Playback

Figure 3:
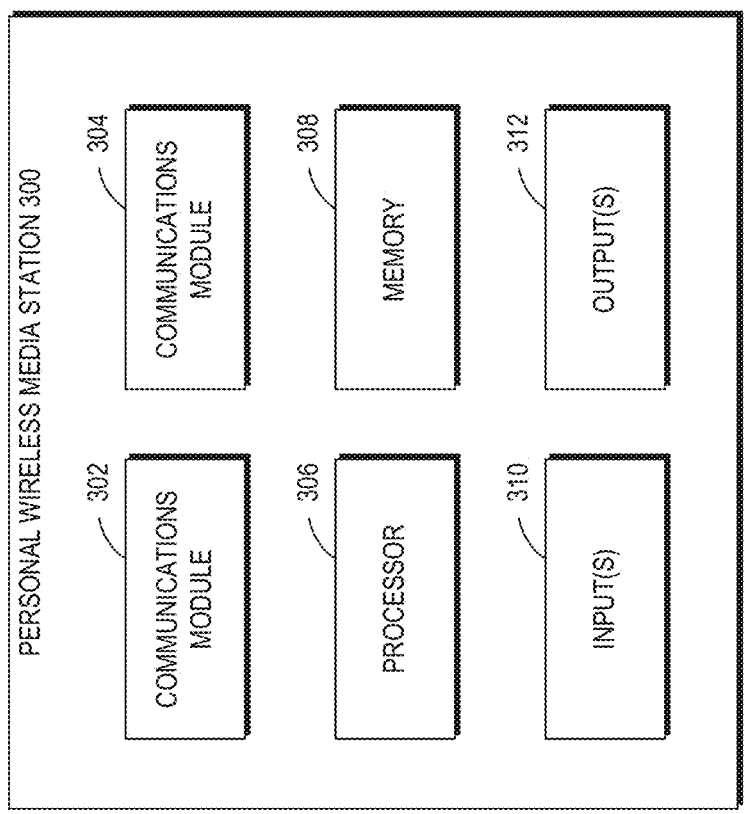
FIG. 3 illustrates a block diagram of a personal wireless media station in accordance with an embodiment.
Figure 4:
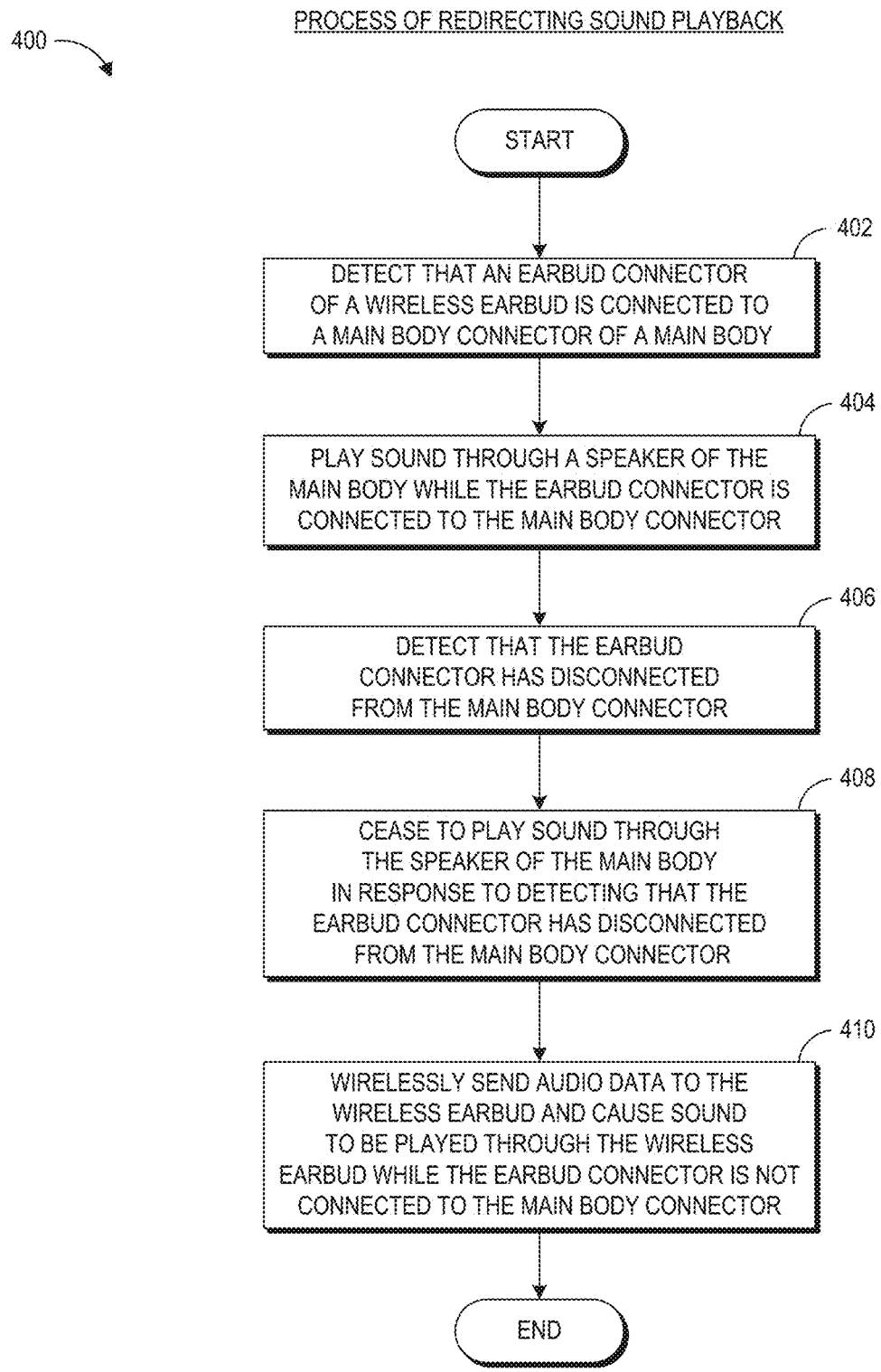
FIG. 4 illustrates a flowchart depicting an example method of redirecting sound playback in accordance with an embodiment.

FIG. 4 is a flowchart illustrating a method 400 for redirecting sound playback, according to an embodiment of the present disclosure. The steps illustrated in FIG. 4 may be performed by the personal wireless media station 200 of FIG. 3, or any components therein, or any other personal wireless media stations discussed herein or other devices (presently known or developed in the future) within the scope of the present disclosure. For convenience, method 400 is described as performed by the personal wireless media station 200.

The method 400 begins at block 401. At block 402, the personal wireless media station 200 detects that the earbud connector of the wireless earbud 204 is connected to the main body connector of the main body 202.

At block 404, the personal wireless media station 200 plays sound through the speaker of the main body 202 while the earbud connector is connected to the main body connector.

At block 406, the personal wireless media station 200 detects that the earbud connector has disconnected from the main body connector.

At block 408, the personal wireless media station 200 ceases to play sound through the speaker of the main body 202 in response to detecting that the earbud connector has disconnected from the main body connector.

At block 410, the personal wireless media station 200 wirelessly sends audio data to the wireless earbud 204 and causes sound to be played through the wireless earbud 204 while the earbud connector is not connected to the main body connector.

As discussed above, there may be situations when the user may want to have a call or listen to the music privately using the wireless earbud 204. In such situations, the user can simply unplug the wireless earbud 204 from the main body 202 of the personal wireless media station 200, and the sound information received from the user device 206 automatically begins to be played back via the wireless earbud 204 without the user having to activate the wireless earbud 204 or press any button(s).

Incoming Text and Email Messages

The personal wireless media station 100 may allow the user to read text messages and emails via the LCD screen 114, without having to maneuver the user device 206. In some embodiments, when a new text message or email arrives, information regarding the text message or email is transmitted to the personal wireless media station 100 by the user device 206. Based on the information received from the user device 206, the personal wireless media station 100 may cause at least a portion of the content of the text message or email on the LCD screen 114. For example, the LCD screen 114 may initially display a notification that a new text message or email has arrived, and upon detecting a user input indicating that the user wishes to view the content of the text message or email, display the beginning portion of the text message or email.

Scrolling

Once the beginning portion of the text message or email is displayed on the LCD screen 114, the personal wireless media station 100 may continue to display the remaining portion of the text message or email by scrolling the content across the LCD screen 114 (e.g., move the text displayed on the LCD screen 114 to the left at a specified speed, with the displayed text disappearing to the left end of the LCD screen 114 and new text appearing from the right end of the LCD screen 114).

Jumping to Next Text Message or Email

The personal wireless media station 100 may cause the next text message or email to be displayed if additional unopened text messages or emails exist. For example, while a text message or email is being displayed on the LCD screen 114, if the user provides a user input indicating that the user wishes to view the next text message or email, the personal wireless media station 100 causes the beginning portion of the next text message or email to be displayed on the LCD screen 114.

Display Scrolling Speed

The user may control the speed at which the text is scrolled across the LCD screen 114, for example, by using the volume up and volume down buttons. Other buttons may be used to control the scrolling speed. For example, if the user slides his finger across the touch-sensitive button in one direction, the personal wireless media station 100 increases the scrolling speed, and if the user slides his finger across the touch-sensitive button in the other direction, the personal wireless media station 100 decreases the scrolling speed.

Page Turning

In some embodiments, the personal wireless media station 100, after causing the beginning portion of the text message or email on the LCD screen 114, awaits a user input indicating that the user wishes to view the next portion of the text message or email. When the user provides such an input (e.g., by activating a button on the personal wireless media station 100), the personal wireless media station 100 causes the next portion of the text message or email to be displayed on the LCD screen 114.

Display Text Size

The user may control the size of the text displayed on the LCD screen 114, for example, by using the volume up and volume down buttons. Other buttons or combinations of buttons may be used to control the text size (e.g., function button+volume up increases the text size and function button+volume down decreases the text size).

Incoming Telephone Call

In some embodiments, when a call is received on the user device 206, the information regarding the call (e.g., information indicating, who the caller is) is transmitted to the personal wireless media station 100, and based on the received information, the personal wireless media station 100 causes caller information to be displayed on the LCD screen 114. Additionally, the personal wireless media station 100 may provide an indication that a call is incoming via the speaker 108 by playing a sound, via the LED indicator 110 by providing a blinking signal, or by vibrating the main body 102.

Taking an Incoming Telephone Call

While a call is incoming, the user may provide a user input to the personal wireless media station 100 to take the call. For example, the user may press the function button to indicate that he wishes to take the call, and in response, the personal wireless media station 100 may transmit the indication to the mobile device 206 and cause the mobile device 206 to take the call. During the call, the sound information is transmitted from the mobile device 206 to the personal wireless media station 100 and the voice information captured by the microphone 112 is transmitted from the personal wireless media station 100 to the mobile device 206. If the wireless earbud 104 is not connected to the main body 102, the personal wireless media station 100 may further relay the sound information to the wireless earbud 104 to be played via the wireless earbud 104.

Black Box Feature

The personal wireless media station 100 may include a black box feature. For example, the personal wireless media station 100 may capture audio data or image data upon user activation of the black box feature. In some embodiments, the personal wireless media station 100 records audio data captured by the microphone 112 in the background and/or records image or video data captured by a camera module (not shown) in the background. The recorded data may be transmitted to the user device 206, and may be discarded after a specified period of time or after a specified amount of new data has been collected.

Charging

The personal wireless media station 100 may charge the wireless earbud 104 while the wireless earbud 104 is plugged into the main body 102. The main body 102 may be charged via a charge port (not shown in FIG. 1) using an external charging cable. When the wireless earbud 104 is plugged into the main body 102 for charging, the wireless communication between the main body 102 of the personal wireless media station 100 and the wireless earbud 104 may be turned off.

No Storage

The personal wireless media station 100 may not have any storage (e.g., nonvolatile memory), and any data output by the personal wireless media station 100 may be stored on volatile memory. For example, the personal wireless media station 100 may only stream sound without permanently storing any audio data on the personal wireless media station 100. The audio data transmitted from the user device 206 to the main body 202 may further be transmitted, and played via the wireless earbud 104.

Mechanical Clip or Necklace

As shown in FIG. 1, the personal wireless media station 100 includes a clip 106 that may be used to attach the personal wireless media station 100 to the user's clothing (e.g., shirt) or accessory (e.g., hat). The clip 106 may be integrated with the body and may include a spring plate that faces the rear surface of the body of the personal wireless media station 100. In some embodiments, instead of or in addition to the clip 106, the personal wireless media station 100 includes a necklace that may be used to hang the personal wireless media station 100 from the user's neck.

Watch

The personal wireless media station 100 may include a watch feature. For example, the LCD screen 114 may display the current time when the LCD screen 114 is idle, when the LCD screen 114 is not displaying information received from the user device 206, or when the user presses one of the buttons of the personal wireless media station 100. The personal wireless media station 100 may further include an alarm function that plays an alarm indication at a specified time via the speaker 108, the LED indicator 110, and/or the LCD screen 114. In some embodiments, the user device 106 may transmit such an alarm indication to the personal wireless media station 100 at the specified time. In response to receiving the alarm indication, the personal wireless media station 100 causes the alarm indication to be output to the user via the speaker 108, the LED indicator 110, and/or the LCD screen 114.

Camera

The personal wireless media station 100 may include a camera feature. The personal wireless media station 100 may capture images via a camera module, and the personal wireless media station 100 may transmit the captured images to the user device 206 and cause the captured images to be stored in the user device 206.

Mobile Phone Application

The user device 206 may have a mobile application installed thereon for configuring the personal wireless media station 100. For example, the mobile application may be configured to set and monitor the Bluetooth pairing with the personal wireless media station. The mobile application may include a feature for finding a personal wireless media station within the communication range. The mobile application may be used to monitor and control the various features of the personal wireless media station 100. The mobile application may be configured to display (or cause the personal wireless media station 100 to display) a low battery warning based on the battery status of the personal wireless media station 100. The mobile phone may be configured to automatically transmit any audiovisual information that may otherwise be displayed on the mobile phone itself to the personal wireless media station 100 when the mobile device 206 is paired with the personal wireless media station 100. The mobile application may also receive audio data and image data captured by the personal wireless media station 100 and store the data in a memory of the mobile device 206.

Example Configuration of Personal Wireless Media Station

FIG. 3 illustrates a block diagram of a personal wireless media station 300, according to an example embodiment. As shown in FIG. 3, the personal wireless media station 300 includes communications modules 302 and 304, a processor 306, a memory 308, input(s) 310, and output(s) 312. The processor 306 may include one or more processors. The input(s) 310 may include one or more microphones, mechanical buttons, touch-sensitive buttons, switches, etc. The memory 308 may be a volatile memory, a non-volatile memory, or a combination thereof. The output(s) 312 may include one or more speakers, LCD screens, LED indicators, etc.

Communication Between Components

Although communication between the components is not illustrated in FIG. 3, each component may communication with one or more other components. For example, the communications modules 302 and 304 may communicate with the user device 206 and the wireless earbud 204 of FIG. 2, respectively. The processor 306 may communicate with each of the other components illustrated in FIG. 3.

Two-Way Wireless Module

In some embodiments, the communications module 302 is a two-way wireless module. In such embodiments, the communications module 302 receives information from the user device 206 as well as transmits information to the user device 206. The communications module 302 may use Bluetooth technology. However, the communications module 302 is not limited as such and may be implemented using any wireless communications standards currently available or developed in the future. For example, the information received from the user device 206 may include call information, caller information, sound information, text, voice, or video message information, and any other information that the user can directly (e.g., without the help of the personal wireless media station 100) access from the user device 206. The information transmitted to the user device 206 may include user input information, recorded sound information, captured image information, and any other information that the user can directly (e.g., without the help of the personal wireless media station 100) provide to the user device 206.

One-Way Wireless Module

In some embodiments, the communications module 304 is a one-way wireless module. In such embodiments, the communications module 304 transmits information to the wireless earbud 104 but does not receive any information from the wireless earbud 104. The communications module 304 may use Bluetooth technology. However, the communications module 304 is not limited as such and may be implemented using any wireless communications standards currently available or developed in the future. For example, the information transmitted to the wireless earbud 104 may include sound information or any other information that the user can directly (e.g., without the help of the wireless earbud 104) access from the main body 102 of the personal wireless media station 100. In some embodiments, the communications module 304 is a two-way wireless module. In other embodiments, the personal wireless media station 300 does not have the communications module 304, and instead, the communications module 302 is used to communicate with both the user device 206 and the wireless earbud 204.

Processor

The processor 306 may receive information and instructions from other computing systems via the communications module 302. Further, the processor 306 may store information in the memory 308 or retrieve information from the memory 308. The processor 306 may process input, information received by the input(s) 310, and provide output information to the output(s) 312. Further, the processor 306 may perform one or more techniques described herein regarding the process of redirecting sound playback. For example, the processor 306 may, via one or more sensors or detectors, detect whether the earbud connector of the wireless earbud 204 is connected to the main body connector of the main body 202. Based on whether the earbud connector of the wireless earbud 204 is connected to the main body connector of the main body 202, the processor 306 may cause different output(s) to play back the sound based on the audio data received from the user device 206.

Memory

The memory 308 may store audio data transmitted from the user device 206. In some embodiments, the memory 308 is a volatile memory and only stores what is currently being transmitted and played back by the personal wireless media station 300. For example, all the data stored in the memory 308 may be lost shortly after use or upon power down of the personal wireless media station 300. In other embodiments, the memory 308 is a nonvolatile memory or a combination of volatile and nonvolatile memory. The memory 308 may include RAM, ROM and/or other persistent, auxiliary or non-transitory computer-readable media. The memory 308 may store computer program instructions to be executed by the processor 306 in the general administration and operation of the personal wireless media station 300. The memory 308 may further include computer program instructions and other information for implementing aspects of the present disclosure.

Input(s)

The personal wireless media station 300 may include one or more inputs (e.g., physical or digital buttons) that allow the user of the personal wireless media station 300 to enter various user commands. In some embodiments, the personal wireless media station 300 includes a function button. The function button may be used to power on or off the personal wireless media station 300 (e.g., by the user pressing and holding the function button for a prolonged amount of time). Further, the function button may be used to answer or end calls, or open or close incoming text messages or emails. In one embodiment, if the user presses the function button twice in a specified period of time, the processor 306 initiates a Bluetooth pairing between the personal wireless media station 300 and the user device 206. The personal wireless media station 300 may include one or more volume control buttons. In some embodiments, the volume control buttons may be used to control the text scroll speed, turn pages of text messages or emails, enable or disable the black box feature described herein (e.g., the volume control buttons may be used to start and end recording audio data or image data).

Output(s)

The output(s) may include one or more speakers, displays, LED indicators, and the like. The speaker may be configured to play sound received from the user device 206. The sound played via the speaker may be a telephone conversation, a song, a voice recording, an alarm, etc. The display may include one or more display screens that display, e.g., under the control of the processor 306, the information processed by the processor 306. The information may include text, images, or other visual content. For example, the display may be provided on a side surface of the personal wireless media station 100 as shown in FIG. 1. The one or more display screens can be any of various conventional displays such as a liquid crystal display (LCD), a light-emitting diode (LED) display, etc., or any other display means to be developed in the future. In certain embodiments, the display is a color display. In other embodiments, the display is not a color display but is grayscale.

Other Components of Personal Wireless Media Station

The personal wireless media station 300 is not limited to the configuration illustrated in FIG. 3, and may include one or more other components. For example, the personal wireless media station 300 may include a camera module configured to capture image data. Such a camera module may communicate with the processor 306 to cause the captured image data to the user device 206 (e.g., via the communications module 302).

Activating and Deactivating Voice Command Feature

The personal wireless media station 300 may be configured to activate or deactivate the voice command feature of the user device 206 based on a user input to the personal wireless media station 300. For example, the user may press a button provided on the personal wireless media station 300, and the button may be configured to generate a command to the user device 206 wirelessly connected to the personal wireless media station 300 to turn on or turn off the voice command feature of the user device 206. Other user inputs to the personal wireless media station 300 may be configured to activate or deactivate other features of the user device 206.

Two-Way Communication with Wireless Earbud

The wireless earbud 204 may be paired with the main body 202 of the personal wireless media station 300 using a two-way wired or wireless communication.

Recording Telephone Calls

In some embodiments, the personal wireless media station 300 may be configured to record telephone calls. The recording may be initiated on the personal wireless media station 300 or the mobile application running on the user device 206. The recording may be stored in cloud storage assigned to the registered user of the user device 206 or the personal wireless media station 300. For example, the user may register his or her personal wireless media station 300 online (e.g., on the provider associated with the personal wireless media station 300 or any other provider of cloud storage services), and cloud storage may be provided to the user for use. The recording may have a file name including the name or the telephone number of the calling party initiating the telephone call.

Additional Features

Hands free phone call and text display—Pinn device control:
+/− key: Earbud volume and text scrolling speed adjustment
Function key
Siri activation (Press and hold the function key for 3 sec.)
Text display on/off (Single press)—On when there is unread text/Off after read
Phone call receive/end (Sing press)—Receive when ringing Power on/off—Desirably, sleep/wake→Off all functions but the Pinn Finder™ is able to find the Pinn (Minimizing battery life is KEY)

Pinn Finder™ (via using Pinn App)—Pinn beeps and blinks when the mobile App is searching Pinn Sound recording (via using Pinn App)
Sound recording using Pinn microphone when not calling
Phone conversation recording when calling (Only available using the App)

LCD display indicates current date/time and battery life status—Display on when single press the function key (When there is no unread text either while no phone call/incoming phone ringing)
Low battery alert (Optional)—LED light indicator blinks in red Automatic Bluetooth on/off—Off when charging Automatic speaker/earbud mode change:
Speaker mode (Earbud off)—When earbud connected to the base station (Earbud charging)
Earbud mode (Speaker off)—When earbud disconnected from the base station Silent mode on/off—LED light indicator only/both LED and speaker Additional Features Siri activation—Press and hold the function key
Earbud volume control—By pressing +/− key while phone call (Volume level 1-7)
Text scroll speed control—By pressing +/− key while displaying text
Speaker output volume control—By pressing +/− key while phone call when earbud connected
Silent mode on/off—Press and hold (−) key for silent mode/press and hold (+) key for normal
Next & previous message display—Double press +/− button
Call waiting—Press and hold function key Additional Features Voice recording start/stop and playback control
Hands free mode on/off (mobile phone default App)
Pinn finder
Device setting
Factory default setting
Earbud volume
Microphone input volume control
Text scrolling speed and type (page turning type or scrolling)
Text inversion (upside down)
LCD brightness control
Siri activation on/off
When on—Press and hold the function button for 3 sec. to activate Sin
When off—Press and hold the function button for 3 sec. to call back to the most recent call
Automatic Bluetooth on/off (Optional)—Automatically off when charging. But could be default function and not able to turn off this function.

Battery charge for both base station and earbud when mini USB cable connected to the base station New earbud pairing in case of earbud lost (Earbud can be sold separately)—By using App (i.e. input earbud serial # for pairing)

Bluetooth priority to the Pinn device (Optional)
Water resistant—IPX 4

Additional Features: Pinn Models

Design—Unique, sleek, fashionable, fancy & compact (Tie clip look)
2 or 3 color options—Platinum, Titanium and/or Gold Additional Features: Accessories Earbud
Charging cable or charging station
Car charger
Necklace strings Additional Features Camera integration
By App setting—Take a photo every 1 minute when on and when not charging
New casing (design)
Smaller & Thinner
Necklace type
Various color/material necklace string can be sold i.e. black, pink, gold & etc.
Easy string replacement but special connecting mechanism required only for Pinn certified strings—This can be applicable for the 1$^{st}$ generation tie pin type Pinn product (TBD)

Belt clip type
　Belt clip holster with Pinn headset
　Etc.
Additional Features: Mobile App
Pinn device setting
Pinn software control
Battery life indication and low battery alert
Sound recording and storage (Storage page is separated like music library)
Siri linking capability
Pinn device finder—Beeps and LED blinks when search
Additional Features: Mobile App
Device setting
　Default setting—TBD
　Earbud volume
　Text scrolling speed
　Text auto display on/off
　LCD brightness
　Microphone input volume
　Speaker output volume
　Siri function on/off
　LED light indicator on/off
　Automatic Bluetooth on/off (Optional)—Automatically off when charging
Function control (including while using the Pinn device)
　Earbud volume control (i.e. 1-10)
　Text scroll speed control
　LCD brightness control
　Microphone input volume control
　Speaker output volume control
　Voice recording start and stop button while phone call—Automatic file name generation
　　Date, time and caller ID
　　Display recorded duration
　　Storage page
　　　Display like music library
　　　　Select file then show playback control and detail information such as date, time, caller ID and etc.
　Hands free mode on/off (mobile phone default and in the app as well)
Additional Features: Mobile App Buttons
Device setting page
Device function control
Device finder
And record library
Additional Features: Mobile App Buttons
Pinn device user can download "Standard App" for free that has all capability listed above.
Pinn user also can select "Monthly Subscription Base App"
　Store recorded data in the "Pinn Cloud" server for users
　Monthly fee base
　　i.e. $1.99/mo for 2 GB
　　　Auto naming for the recorded data—Name includes caller ID
　Also provide photo storage for the $2^{nd}$ generation Pinn product that includes camera

OTHER CONSIDERATIONS

Although the embodiments of the inventions have been disclosed in the context of a certain preferred embodiments and, examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above, and that various changes in form and details may be made without departing from the spirit and scope of the present disclosure as set forth in the following claims.

What is claimed is:

1. An apparatus comprising:
　a main body comprising a connection hole, a user input button, at least one processor and at least one memory; and
　a wireless earbud configured for plugging into the connection hole of the main body to form a single integrated body with the main body,
　wherein the wireless earbud has wireless communication capability for wirelessly pairing with a smartphone and is configured to receive audio data from the smartphone and to play audio using the audio data from the smartphone when wirelessly paired with the smartphone,
　wherein in addition to wireless communication capability for wireless pairing with the smartphone, the wireless earbud comprises an earbud connector for connecting with an electric circuit of the main body for wired communication capability with the main body when plugged into the connection hole,
　wherein, when wireless earbud is plugged into the connection hole, the wireless earbud is configured to perform wired two-way data communication with the main body,
　wherein the at least one processor of the main body is configured to execute computer program instructions stored in the at least one memory
　　for initiating the wireless pairing with the smartphone in response to pressing of the user input button provided on the main body,
　　for initiating battery charging of the wireless earbud in response to the wireless earbud's plugging into the connection hole, and
　　for turning off the wireless pairing with the smartphone when the wireless earbud is being charged.

2. The apparatus of claim 1, wherein the main body further comprises a mechanical clip attached to the main body for clipping the main body to a person's clothing or accessory.

3. The apparatus of claim 1, wherein the main body further comprises a camera.

4. The apparatus of claim 1, wherein the main body further comprises a wireless communication module configured to wirelessly pair with the smartphone and perform wireless data communication with the paired smartphone.

5. The apparatus of claim 4, wherein the main body further comprises a display configured to display information from the smartphone by wireless data communication.

6. The apparatus of claim 4, wherein the main body further comprises a speaker configured to play sound based on wireless data communication with the smartphone.

7. The apparatus of claim 6, wherein the apparatus is programmed:
- to detect when the wireless earbud is plugged into the connection hole,
- to play sound through the speaker of the main body while the wireless earbud is plugged into the connection hole,
- to detect when the wireless earbud is unplugged from the connection hole, and
- to stop playing sound through the speaker when it is detected that the wireless earbud is unplugged from the connection hole.

8. The apparatus of claim 7, wherein the apparatus is further programmed to cause audio data to be sent to the wireless earbud and to play sound through the wireless earbud while the wireless earbud is unplugged from the connection hole.

9. The apparatus of claim 1, wherein, when paired with the smartphone, the apparatus is configured:
- to provide a battery status to the smartphone for displaying on a mobile application of the smartphone; and
- to let the mobile application control at least one function of the apparatus.

10. A method of operating the apparatus of claim 1, the method comprising:
- initiating wireless pairing with the smartphone in response to pressing of the user input button provided on the main body; and
- turning off the wireless pairing with the smartphone when the wireless earbud gets charged from the main body.

11. An apparatus comprising:
- a main body comprising a connection hole, a user input button, at least one processor and at least one memory; and
- a wireless earbud configured for plugging into the connection hole of the main body to form a single integrated body with the main body,
- wherein the wireless earbud has wireless communication capability for wirelessly pairing with a smartphone and is configured to receive audio data from the smartphone and to play audio using the audio data from the smartphone when wirelessly paired with the smartphone,
- wherein in addition to wireless communication capability for wireless pairing with the smartphone, the wireless earbud comprises an earbud connector for connecting with an electric circuit of the main body for wired communication capability with the main body when plugged into the connection hole,
- wherein, when plugged into the connection hole, the wireless earbud is configured to get battery charging from the main body and additionally to perform two-way data communication with the main body,
- wherein the main body further comprises a speaker configured to play sound based on wireless data communication with the smartphone;
- wherein the apparatus is programmed:
  - to detect when the wireless earbud is plugged into the connection hole,
  - to play sound through the speaker of the main body while the wireless earbud is plugged into the connection hole,
  - to detect when the wireless earbud is unplugged from the connection hole, and
  - to stop playing sound through the speaker when it is detected that the wireless earbud is unplugged from the connection hole.

12. The apparatus of claim 11, wherein the main body further comprises a mechanical clip attached to the main body for clipping the main body to a person's clothing or accessory.

13. The apparatus of claim 11, wherein the main body further comprises a camera.

14. The apparatus of claim 11, wherein the main body further comprises a wireless communication module configured to wirelessly pair with the smartphone and perform wireless data communication with the paired smartphone.

15. The apparatus of claim 14, wherein the main body further comprises a display configured to display information from the smartphone by wireless data communication.

16. The apparatus of claim 11, wherein the apparatus is further programmed to cause audio data to be sent to the wireless earbud and to play sound through the wireless earbud while the wireless earbud is unplugged from the connection hole.

17. The apparatus of claim 11, wherein, when paired with the smartphone, the apparatus is configured:
- to provide a battery status to the smartphone for displaying on a mobile application of the smartphone; and
- to let the mobile application control at least one function of the apparatus.

18. A method of operating the apparatus of claim 11, the method comprising:
- initiating wireless pairing with the smartphone in response to pressing of the user input button provided on the main body; and
- turning off the wireless pairing with the smartphone when the wireless earbud gets charged from the main body.

* * * * *